United States Patent [11] 3,612,868

[72] Inventors Klaus H. Becker
 Oak Ridge;
 Joseph S. Cheka, Knoxville; Richard B. Gammage, Oak Ridge; Eddie M. Robinson, Knoxville, all of Tenn.
[21] Appl. No. 50,270
[22] Filed June 26, 1970
[45] Patented Oct. 12, 1971
[73] Assignee The United States of America as represented by the United States Atomic Energy Commission

[54] HIGH-SENSITIVITY STIMULATED EXOELECTRON EMISSION RADIATION DOSIMETERS
 19 Claims, 3 Drawing Figs.
[52] U.S. Cl. .................................................. 250/83 R, 250/83 CD, 250/83.3 R
[51] Int. Cl. ..................................................... G01t 1/04
[50] Field of Search ........................................... 250/83 R, 83 CD, 83.3 R

[56] References Cited
UNITED STATES PATENTS
3,290,179 12/1966 Goulding ...................... 250/83.3 R X
3,375,372 3/1968 Miyashita ...................... 250/83 R X
3,484,610 12/1969 Becker ........................... 250/83.3 R Primary Examiner—Archie R. Borchelt
Attorney—Roland A. Anderson ABSTRACT: An inert metal, such as palladium, platinum, or gold, in low concentration, impregnated or diffused to a sufficient depth in materials which exhibit the physical effect of stimulated exoelectron emission (SEE), substantially increases the radiation sensitivity of the SEE materials by permitting a larger percentage of exoelectrons to be emitted therefrom. The reproducibility of response is also increased. Impregnation or diffusion in such materials can be accomplished, for example, by thermal diffusion of metal layers into the surface or throughout the bulk material. The exact procedure for obtaining optimized sensitivity depends upon which inert metal is utilized with a given SEE material, the thickness of the metal, and the diffusion conditions.

INVENTORS.
Klaus H. Becker
Joseph S. Cheka
Richard B. Gammage
Eddie M. Robinson

BY

ATTORNEY.

HIGH-SENSITIVITY STIMULATED EXOELECTRON EMISSION RADIATION DOSIMETERS

BACKGROUND OF THE INVENTION

The invention described herein was made in the course of, or under, a contract with the United States Atomic Energy Commission.

Stimulated exoelectron emission (SEE) is a phenomenon exhibited by certain materials characterized by the emission of electrons from the material when stimulated by the application of external energy. For example, the electrons are emitted by optical stimulation (OSEE) or thermal stimulation (TSEE).

The principle of thermally stimulated exoelectron emission (TSEE) dosimetry was described in the patent of Klaus H. Becker, U.S. Pat. No. 3,484,610 issued Dec. 16, 1969, and having a common assignee with the present application. Specifically disclosed in the above patent were improved multicomponent diameters together with encapsulated forms thereof. The dosimeter element was typically prepared by mixing a detecting substance, or substances, with a conductive material such as graphite. Furthermore, it was recognized that for practical dosimetry the detecting element should be encapsulated to improve handling and reading characteristics.

It has now been discovered that certain types of sintered or ceramic beryllium oxides may be used as TSEE radiation dosimeters and that such dosimeter substances have a high-thermal conductivity, are very hard, are impervious to water, and are insoluble in most liquids. In addition, unlike BeO powder, the ceramic BeO substances are essentially nontoxic. Thus, such substances do not necessarily require encapsulation.

Although the ceramic BeO substances provide a dosimeter that is more sensitive than most dosimeters of the above-mentioned patent, it is, for many purposes, desirable to provide a dosimeter whose sensitivity may be increased even further and whose reproducibility of response is improved. The present invention was conceived to provide a more sensitive dosimeter in a manner to be described hereinbelow.

SUMMARY OF THE INVENTION

It is the object of the present invention to provide an improved thermally or optically stimulated exoelectron emission radiation dosimeter that has a substantially improved sensitivity.

The above object has been accomplished in the present invention by impregnating SEE dosimeter materials, such as ceramic BeO, to a sufficient depth or throughout the bulk material with an inert metal such as palladium, platinum, or gold in low concentration. The radiation sensitivity of such prepared materials is substantially better than that achievable by the prior art, particularly when palladium or platinum is utilized in the fabrication of such dosimeters, which will become evident upon a consideration of the following detailed specification. This is equally applicable for optical stimulation although the details herein pertain to TSEE dosimetry.

DESCRIPTION OF THE PREFERRED EMBODIMENTS

It has been determined that for a given TSEE material and metal-coating thickness the temperature and time of heating were the controlling factors in obtaining an optimum reproducibility and sensitivity. While the mechanism of achieving increased sensitivity is not known, it is thought to be a reduction in the work function of the TSEE material by a diffusion of the metal into the crystal lattice thereof, thus forming a solid solution of the metal, or by filling the microscopic intercrystalline spaces at grain boundaries. The reason for the improved reproducibility of the detector response is probably an increase of the electrical conductivity of the material which prevents a buildup of local electrical charges on the emitting surface.

Figure 1:
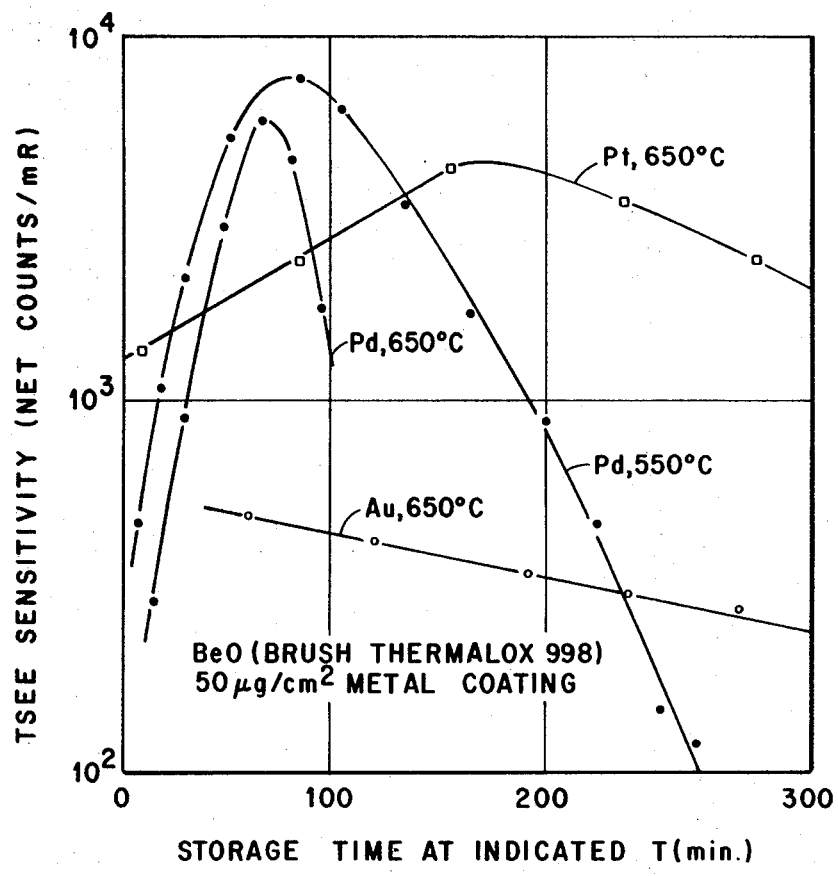
FIG. 1 is a graph illustrating the sensitivities achievable with various ceramic BeO discs which were coated on one flat surface with different metals.

In order to demonstrate some of the improved results achieved in the present invention, three sets of ceramic beryllia discs (Brush Thermalox 998) were coated by vapor deposition on one flat surface: one set was coated with 50 $\mu$g./cm.$^2$ platinum; one set with 50 $\mu$g./cm.$^2$ gold; and one set with 50 $\mu$g./cm.$^2$ palladium. The coated discs were then heated at either 550° or 650° C. for various time durations for diffusion of the metal from the surface into the bulk material thereof, and the TSEE sensitivity of each was measured by exposing them to a small gamma radiation dose and then reading them by measuring the electron emission during gradual heating (1° c./sec.) in a device such as that described in the above-mentioned patent. The results of such measurements are plotted in FIG. 1 of the drawings. It may be seen that the maximum sensitivity of the Pd-diffused discs was obtained after heating 65-80 minutes and thereafter the sensitivity decreased. Dosimeters having the maximum sensitivity are capable of detecting doses as low as a few $\mu$R of radiation, corresponding to less than 1 hour of normal environmental radiation. The maximum sensitivity for the Pt-diffused dosimeter discs was achieved at about 160 minutes, while there appeared to be no maximum in the heating curve for Au-diffused discs in this experiment. In other experiments involving shorter heating times or lower diffusion temperatures, however, a sensitivity maximum was obtained also with gold. In any event, it can be seen that the dosimeters diffused with platinum or with palladium have a substantially greater sensitivity than those diffused with gold.

A small sensitivity has been observed in some preannealed ceramic BeO immediately after coating with a thin metal layer prior to the diffusion heat treatment. It is, however, unlikely that these exoelectrons actually are emitted through the metal. The initial metal layer is not free from holes and perforations, and the sensitivity is considerably increased by the diffusion treatment.

Figure 2:
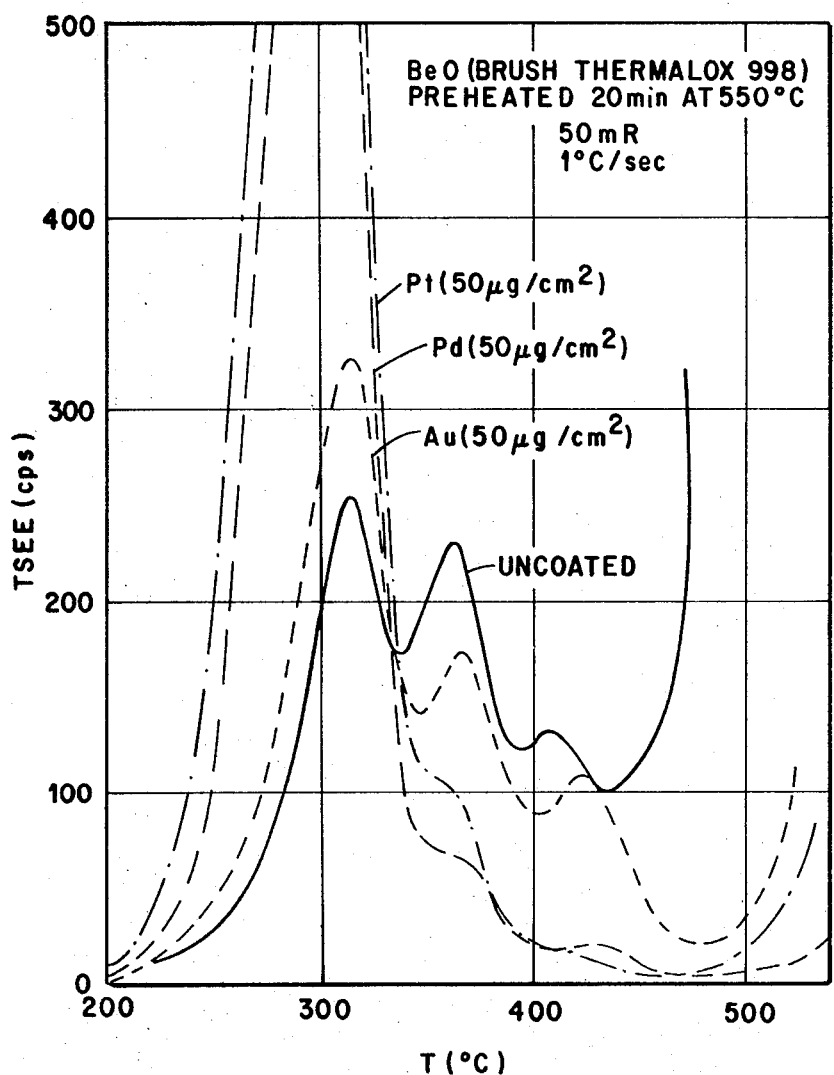
FIG. 2 is a graph also illustrating the effect of different coatings of metals on ceramic BeO discs.

The effect of different metals utilized in coating and subsequent diffusion of the dosimeters is also illustrated in FIG. 2 of the drawings. An uncoated BeO disc, after being subjected to 50 mr. gamma radiation exhibited a poorly reproducible TSEE-versus-temperature plot as shown with the solid line in FIG. 2. The primary peak of electron emission occurred near 300° C. under the present experimental conditions (the peak location depends somewhat on the counter design and heating rate). A gold-diffused BeO disc, preheated at 550° C. for 20 minutes, exhibited a slightly improved TSEE output of the main peak and a reduction in the high-temperature peaks, resulting in a total sensitivity similar to that of the untreated material (about maximum in terms of FIG. 1 results). On the other hand, although maximum sensitivity for pd- and Pt-diffused discs is not achieved in 20 minutes, they emitted substantially greater numbers of electrons in the main peak.

Figure 3:
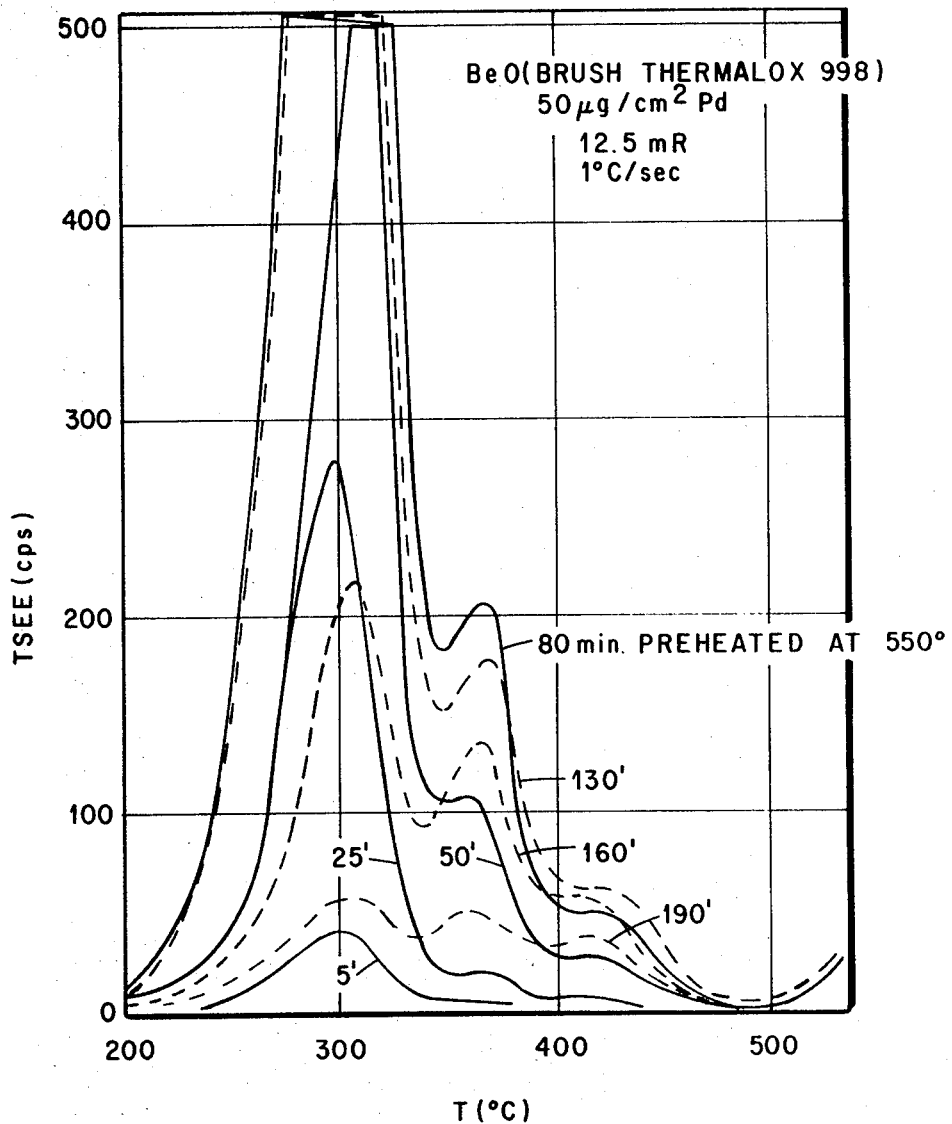
FIG. 3 is a graph further illustrating the effect of heating time as applied to palladium-coated BeO discs.

The effect of heating time is further illustrated in FIG. 3 of the drawings as applied to palladium-diffused BeO discs. These were preheated at 500° C. for various times and then subjected to 12.5 mr. gamma radiation. Again it was demonstrated that diffusion times between about 50 minutes and 130 minutes substantially increased the sensitivity of the dosimeters.

It has been determined that, if the initial metal layer is thinner, less diffusion time (or a lower temperature) is required for obtaining the optimum concentration of the metal at the surface. However, for the diffusion times and temperatures used in the above experiment, there is a maximum sensitivity for initial amounts of metal in the range from 10 to 100 $\mu$g./cm.$^2$ Further experiments have demonstrated that it will be advantageous for the thermal stability of the detectors if the thickness, as well as the diffusion temperatures and/or time, is considerably increased. Plating detectors with 1–2 mg./cm.$^2$ of platinum and heating for 10–20 hours at 1,000° to 1,500° C., for example, result in the same optimized surface concentration of platinum and high sensitivity as the treatment described above, but a much deeper penetration of the metal into the bulk of the material is effected. Frequent heating of such detectors to the temperatures used for the dosimeter evaluation thereof then does not alter their properties any more. For example, the peak sensitivity of such detectors with the deeper penetration of the metal therein will remain substantially constant even with further heating times after the peak sensitivity has been reached, and thus the peak will not decrease with such further heating times as in the case of the examples illustrated in FIG. 1, discussed hereinabove. Thus, it should be understood that the initial amount of metal is not necessarily limited to the range from 10 to 100 $\mu$g./cm.$^2$, as mentioned hereinabove for the described specific examples, but may be of any selected value in the range from 10 to $10^4$ $\mu$g./cm.$^2$ Another modification of the metal treatment consists of plating the detector material with a very thick, >10 mg./cm.$^2$, metal layer, optimizing diffusion time and temperature empirically as described above, and then removing the remaining undiffused metal layer, for example, by simply peeling it off. This leaves a detector surface which is essentially free of metal other than the diffused fraction. Such detectors are, in some cases, particularly sensitive and reproducible. With ceramic BeO discs which had been coated with 15 mg./cm.$^2$ of Au, after heating for 3 days to 800° C. and removal of the remaining metallic coating, a standard deviation of the dose response of 2 percent has been obtained. The results with Pd and Pt coatings are similar, and the sensitivity of the resultant dosimeters was higher, as above described. Reduction of the total amount of metal at the detector surface is also desirable from the point of view of the detector's energy response (oversensitivity for X radiation). For this reason, the use of metals with lower atomic number such as Pd (Z=46) is preferably to that of Pt (Z=78) and Au (Z=79).

The radiation response of all detectors as described hereinabove is proportional to the dose, but less than linear. Exposed detectors have been kept in vacuo, in water vapor, oxygen, nitrogen, and carbon dioxide for hours at temperatures exceeding 100° C., without any detectable fading. Fading may, however, occur if the storage temperature approaches the peak temperature.

In addition to the main TSEE peak around 280°–300° C., as discussed above, one or two additional peaks occur in ceramic BeO at considerably higher temperatures. It has been shown in experiments that annealing (reading) of the lower peak does not affect the dose accumulation in these higher peaks. It is, therefore, possible to use the peak around 300° C. for interval dose measurements and read the high-temperature peak(s) only for the determination of doses which have been accumulated during a long period of time, or for the confirmation of important dose measurements, for example, in radiation accidents.

It should be understood that the present invention is not limited to the use of the above-mentioned metals as coating materials. For example, other metals such as rhodium or osmium may be useful for enhancing the dosimeter sensitivities The desirable criteria for any such other metals are: nonreactive with the TSEE materials; not subject to any substantial chemical change under the temperature conditions of preparation, use, or readout; and nonvolatile at all these temperatures.

While the present invention described above has been dealing only with ceramic BeO discs, tests with other ceramic, similarly coated and diffused materials such as MgO and Al$_2$O$_3$ are expected to show comparable results to those achieved with the diffused BeO discs. Similar results have already been demonstrated with BeO in forms other than discs. The criteria for useable SEE materials are: solid ionic compounds which are sufficiently resistant against heat and chemical reactions under their conditions of use, and which exhibit SEE peaks a convenient temperature range (about 150°–600° C.) as a result of either the inherent structure or pretreatment by heating, irradiation, or the addition of dopants. In other words, it should be understood that the present invention encompasses all SEE materials in the form of thermally resistant inorganic ionic crystals.

It can be expected that a comparable sensitivity increase is obtainable if optical stimulation is used for the reading of the dosimeter. For example, a microbeam of intense light may be used for this purpose. In this case, thermal stability would not be an important factor for the choice of the SEE emitter and sensitizing metal.

In summary, the present invention as described hereinabove is a means and/or method of considerably increasing the reproducibility and/or sensitivity of SEE (either TSEE or OSEE) radiation dosimeters which comprises: coating the effective surface of the dosimeter material with a selected thickness from about 10 to $10^4$ $\mu$g./cm.$^2$ of an inert, heat-resistant metal such as platinum, palladium, gold, or similar suitable metals, and heating the coated dosimeter for an empirically determined time at a selected temperature between about 400° and 1,500° C. to effect a maximum sensitivity thereof for subsequent dosimeter use. The dosimeters are then used for detecting purposes at temperatures not to exceed the pretreatment temperatures to avoid changes in the dosimeter sensitivity during repeated use thereof.

It should be understood that the present invention is not limited to the impregnation or diffusion of an inert metal into the surface or into deeper areas of SEE dosimeter materials by the methods described hereinabove. For example, the inert metal may be dispersed throughout the dosimeter material by other methods such as chemical impregnation or addition during the manufacturing process. The peak sensitivities obtainable with the respective dosimeters with respective inert metals dispersed throughout the dosimeter materials are expected to be comparable to those obtained with the dosimeter materials coated and subsequently diffused with the respective inert metals.

It should be understood that dosimeters prepared in any of the above-described manners may be used for determining the dose of many types of radiation including electrons of all energies, charged particles, and ultraviolet light in the same manner as described in the above-mentioned patent.

The availability of ultrasensitive radiation detectors, as provided by the present invention, opens new possibilities for personnel dosimetry, solid-state microdosimetry, environmental monitoring, and imaging of the spatial distribution of radiation fields. These principles may also be useful in the current study of TSEE in lunar materials and for other scientific studies related to exoelectron emission, the photoelectric effect, and surface properties of ionic crystals.

The present invention has been described by way of illustration rather than limitation, and it should be apparent that it is equally applicable in fields other than those described.

What is claimed is:

1. An improved dosimeter for the detection of radiation comprising a material selected from the group consisting essentially of exoelectron emission substances, said selected material being diffused throughout at least a portion thereof with an inert, chemically inactive metal selected from the group consisting essentially of palladium and platinum, said dosimeter material adapted to be stimulated by means selected from the group consisting essentially of thermal energy and optical energy to provide an emission of exoelectrons whose number depends on the radiation dose to said dosimeter, whereby the radiation detection sensitivity and reproducibility of response of said impregnated dosimeter material is substantially increased by use of said inert metal.

2. The dosimeter set forth in claim 1, wherein said selected dosimeter material is beryllium oxide.

3. The dosimeter set forth in claim 1, wherein said selected inert metal is palladium.

4. The dosimeter set forth in claim 1, wherein said selected inert metal is platinum.

5. A method for substantially increasing the sensitivity and reproducibility of response of an exoelectron emission radiation dosimeter material comprising the steps of impregnating the surface of said dosimeter material with an inert, chemically inactive metal selected from the group consisting essentially of palladium and platinum, and heating the impregnated dosimeter material for an empirically determined time at a selected temperature in the range from 400° C. to 1,500° C. for effecting the diffusion of said metal throughout at least a portion of said dosimeter material, whereby said preheated diffused dosimeter material will have a substantially improved radiation sensitivity and reproducibility of response when said material is utilized to measure doses of ionizing radiation, said radiation sensitivity and reproducibility of response being adapted to be determined by measuring the emission of exoelectrons during stimulation by means selected from the group consisting essentially of thermal and optical energy transfer.

6. The method set forth in claim 5, wherein said impregnation step comprises plating a surface layer of said inert metal onto said stimulated exoelectron emission material and diffusing at least a portion of said metal layer into said stimulated exoelectron emission material during said heating step, said heating time being of a selected value in the range from 10 hours to 3 days.

7. The method set forth in claim 6, wherein any remaining nondiffused metal surface layer is removed after the heating step and prior to the use of the dosimeter.

8. The method set forth in claim 5, wherein said dosimeter material is beryllium oxide and said selected inert metal is coated on at least one surface of said dosimeter material prior to said heating step in an amount in the range from about 10 to $10^4$ $\mu g./cm.^2$ 9. The method set forth in claim 8, wherein said selected inert metal is palladium.

10. The method set forth in claim 8, wherein said selected inert metal is platinum.

11. The method set forth in claim 6, wherein said dosimeter material is sintered beryllium oxide, and said selected inert metal is coated on at least one surface of said material prior to said heating step in an amount in the range from about 1–15 mg./cm.$^2$ , said temperature range being from 800° C. 1,500° C.

12. The method set forth in claim 11, wherein any remaining nondiffused metal surface layer is removed after the heating step and prior to the use of the dosimeter.

13. The method set forth in claim 12, wherein said selected inert metal is palladium.

14. The method set forth in claim 12, wherein said selected inert metal is platinum.

15. A method for substantially increasing the sensitivity and reproducibility of response of an exoelectron emission radiation dosimeter material comprising the steps of plating the surface of said material with a layer of an inert, chemically inactive metal selected from the group consisting essentially of palladium, platinum, and gold, said plating having a thickness of a selected value in the range from 1 to 15 mg./cm.$^2$, heating the plated dosimeter material for an empirically determined time at a selected temperature in the range from 1,000° C. to 1,500° C. for effecting the diffusion and deep penetration of said metal throughout at least a portion of said dosimeter material, said heating time being of a selected value in the range from 10 hours to 3 days, and removing any remaining nondiffused metal surface layer from said material after said heating step and prior to the use of the dosimeter.

16. The method set forth in claim 15, wherein said dosimeter material is beryllium oxide.

17. The method set forth in claim 16, wherein said selected inert metal is palladium.

18. The method set forth in claim 16, wherein said selected inert metal is platinum.

19. The method set forth in claim 16, wherein said selected inert metal is gold.